(12) United States Patent
Huckfeldt et al.

(10) Patent No.: US 7,687,122 B2
(45) Date of Patent: Mar. 30, 2010

(54) WRAPPING NET FOR SAUSAGES AND METHOD FOR PRODUCTION THEREOF

(75) Inventors: Gebhard Rudolf Huckfeldt, Hamburg (DE); Christian Ludwig Hanisch, Heist (DE)

(73) Assignee: Huckfeldt & Thorlichen GmbH & Co., Tornesch (DE)

( * ) Notice: Subject to any disclaimer, the term of this patent is extended or adjusted under 35 U.S.C. 154(b) by 1123 days.

(21) Appl. No.: 11/323,200

(22) Filed: Dec. 30, 2005

(65) Prior Publication Data

US 2006/0134356 A1     Jun. 22, 2006

Related U.S. Application Data

(63) Continuation-in-part of application No. 10/657,678, filed on Sep. 8, 2003, now abandoned, and a continuation-in-part of application No. PCT/EP2004/007327, filed on Jul. 5, 2004.

(30) Foreign Application Priority Data

Jul. 16, 2003  (EP) ................................. 03 016 155

(51) Int. Cl.
  *B29D 22/00*  (2006.01)
  *B29D 28/00*  (2006.01)
(52) U.S. Cl. ........................ 428/34.8; 426/105; 66/195
(58) Field of Classification Search ................ 206/802; 426/105; 428/34.8; 225/3, 104, 93; 220/265, 220/270; 452/49, 50; 229/307, 308, 311, 229/87.05, 924, 926; 66/195
See application file for complete search history.

(56) References Cited

U.S. PATENT DOCUMENTS

| | | | | |
|---|---|---|---|---|
| 1,201,803 A | * | 10/1916 | Chace | ........................ 66/195 |
| 1,328,028 A | * | 1/1920 | Ahana | ........................ 229/311 |
| 1,505,218 A | * | 8/1924 | Sartore | ........................ 452/35 |
| 1,821,011 A | * | 9/1931 | Greenlaw | ................... 229/311 |
| 2,366,710 A | * | 1/1945 | Dimond | ................... 138/118.1 |
| 2,978,164 A | * | 4/1961 | Williams et al. | .............. 383/79 |
| 3,030,003 A | * | 4/1962 | Schanzle | ..................... 383/79 |

(Continued)

FOREIGN PATENT DOCUMENTS

DE     28 11 340 A     9/1979

(Continued)

OTHER PUBLICATIONS

Machine translation of DE 2811340.*

*Primary Examiner*—Rena L Dye
*Assistant Examiner*—Michele Jacobson
(74) *Attorney, Agent, or Firm*—Alix, Yale & Ristas, LLP

(57) ABSTRACT

A tubular encasing netting for sausage and similar articles. The encasing netting contains a longitudinally running tear-open thread, the length of which is greater than that of the encasing netting in the state of use of the latter. This results in loops of the tear-open thread which are accessible from outside and which can be grasped for tearing open. The encasing netting is expediently a double-rib or warp-knit fabric. The tear-open thread is received in stitches of this fabric. The invention relates, furthermore, to a method for producing such an encasing netting, to a sausage casing connected to the encasing netting and to an article encased by this encasing netting.

15 Claims, 1 Drawing Sheet

U.S. PATENT DOCUMENTS

| | | | | |
|---|---|---|---|---|
| 3,251,201 | A * | 5/1966 | Newman | 66/192 |
| 3,265,286 | A | 8/1966 | Inoue | |
| 3,301,687 | A | 1/1967 | Davy | |
| 3,528,601 | A * | 9/1970 | Ito et al. | 229/87.05 |
| 3,578,028 | A * | 5/1971 | Roberts | 138/123 |
| 4,036,037 | A * | 7/1977 | Huckfeldt | 66/170 |
| 4,071,138 | A * | 1/1978 | Wright | 206/83.5 |
| 4,563,231 | A | 1/1986 | Porrmann et al. | |
| 4,569,439 | A * | 2/1986 | Freye et al. | 206/83.5 |
| 4,621,482 | A * | 11/1986 | Crevasse et al. | 53/439 |
| 4,690,843 | A * | 9/1987 | Inagaki | 428/34.8 |
| 4,773,203 | A * | 9/1988 | Yamaguchi | 53/492 |
| 4,902,140 | A * | 2/1990 | Branson | 383/25 |
| 5,043,194 | A | 8/1991 | Siebrecht et al. | |
| 5,059,033 | A * | 10/1991 | Branson | 383/13 |
| 5,397,612 | A * | 3/1995 | Small et al. | 428/36.1 |
| 5,413,148 | A * | 5/1995 | Mintz et al. | 138/118.1 |
| 5,577,366 | A * | 11/1996 | Higgins | 53/399 |
| 5,712,007 | A * | 1/1998 | Mercuri | 428/34.8 |
| 5,855,231 | A * | 1/1999 | Mintz | 138/118.1 |
| 5,868,612 | A * | 2/1999 | Mercuri | 452/32 |
| 5,939,156 | A * | 8/1999 | Rossi et al. | 428/34.8 |
| 5,980,374 | A * | 11/1999 | Mercuri | 452/21 |
| 6,180,150 | B1 * | 1/2001 | Schafer | 426/410 |
| 6,582,290 | B2 * | 6/2003 | Hihnala et al. | 452/50 |
| 6,804,978 | B2 * | 10/2004 | Kost | 66/195 |
| 7,247,359 | B1 * | 7/2007 | Mercuri | 428/34.8 |
| 7,293,433 | B1 * | 11/2007 | McMurray | 66/170 |
| 2003/0106347 | A1 * | 6/2003 | Kost | 66/195 |
| 2003/0173397 | A1 * | 9/2003 | Kourakov | 229/311 |
| 2004/0176658 | A1 * | 9/2004 | McMurray | 600/37 |

FOREIGN PATENT DOCUMENTS

| | | | |
|---|---|---|---|
| DE | 2811340 | * | 9/1979 |
| DE | 29 40 775 A | | 4/1981 |
| DE | 31 27 444 A | | 2/1983 |
| EP | 0 068 233 A | | 1/1983 |

* cited by examiner

WRAPPING NET FOR SAUSAGES AND METHOD FOR PRODUCTION THEREOF

CROSS-REFERENCE TO RELATED APPLICATIONS

This application is a continuation-in-part of U.S. application Ser. No. 10/657,678 filed Sep. 8, 2003 now abandoned and of PCT Application No. PCT/EP2004/007327 filed Jul. 5, 2004.

BACKGROUND OF THE INVENTION

It is known to surround sausage with an encasing netting which is extendible in the longitudinal direction because of its tied or knitted structure. This is originally intended to relieve the sausage casing of the filling pressure. It nowadays assumes more and more a decorative character. It is therefore used not only for types of sausage which shrink in a ripening process and from which it can therefore easily be removed later, but also for fresh sausage. When, in the latter case, the encasing netting is cut lengthways so that it can be removed, the sausage surface is also unavoidably cut into, this being undesirable. It is known, admittedly, to provide stitched sausage casings with a tear-open thread within the seam (DE-U-7807929, DE-A-3725263, DE-A-2811340, DE-A-3127444). However, encasing nettings are tied or knitted seamlessly as a tube, so that a longitudinal seam, into which a tear-open thread could be inserted, is not available there. They are also produced continuously, and therefore the tear-open thread is bound over its entire length into the encasing netting and there is no projecting end at which it could be grasped.

SUMMARY OF THE INVENTION

The object on which the invention is based is to make it easier to open the encasing netting. The solution according to the invention is to provide it with a tear-open thread, the length of which is greater than that of the encasing netting in the state of use and which forms at least one loop which can be grasped from outside in order to initiate the tearing-open operation.

Its ends are connected to points of the netting which are at a greater distance from one another in the longitudinally extended state than in the state of use. The netting is produced in the longitudinally extended state. It thereby has a greater length in the production state than in the state of use. The tear-open thread is bound in with a length which corresponds to the length of the netting during production. When the netting is thereafter reduced to the length of use, the tear-open thread forms loops wherever it is not retained by the netting, that is to say in the open netting honeycombs. It can be grasped there. The result can therefore be described by stating that, in the state of use of the encasing netting, that is to say, in particular, on the filled sausage, the tear-open thread forms at least one loop, preferably a multiplicity of loops, which are accessible from outside and which can be grasped for tearing open.

It is conceivable, admittedly, simply to stitch the tear-open thread to the encasing netting on the inside, as is known in the case of film casings in which it cannot be grasped from the outside (US-A-3265286). However, since, as a rule, the encasing netting strands are relatively thick, it is very difficult, with a tear-open thread placed in this way, to exert a sufficient tearing-open action on the strands of the casing netting. According to an important feature of the invention, therefore, there is provision for the honeycomb strands of the netting, that is to say the strands which form the netting honeycomb, to be composed of knitting stitches and for the tear-open thread to be bound into these by knitting. This means that the tear-open thread does not have to sever the entire thickness of the netting strand, but only part of the netting strand, to be precise only that thread or those threads which are placed outside the tear-open thread in the netting strand. This is preferably only a single thread, that is to say only a small part of the total strand cross section. As soon as it is torn through under the action of the tear-open thread, the stitch belonging to it comes loose, with the result that the strand is severed.

This effect is easily achieved when the honeycomb strands of the encasing netting, through which the tear-open thread is led, are designed in knitting terms as chain stitches of a double-rib or warp-knit fabric. In this case, the tear-open thread may lie between a pair of stitch legs and a sinker thread which stretches from a stitch foot of one stitch to the stitch foot of the next stitch. The tear-open thread can thus be bound in particularly easily. Moreover, what can be achieved particularly easily in this way is that only one thread lies outside the tear-open thread, to be precise the sinker thread. If, during production, the latter initially lies within the double-ribbed or warp-knitted netting tube, the netting tube is reversed after production.

So that tearing open is not made more difficult due to the fact that a plurality of successive netting strands containing the tear-open thread slip along the tear-open thread and gather together to form a robust bundle, it may be expedient to secure them. This may be carried out, for example, by adhesively bonding them to the sausage casing and/or the tear-open thread.

For the sake of easier processability, the encasing netting is expediently firmly connected, for example adhesively bonded, to the associated sausage casing. If the sausage casing is a woven or knitted fabric impregnated with a sealing composition such as collagen, adhesive bonding may take place simultaneously with the application of this composition and by means of this composition. If the encasing netting is applied only after the solidification of the composition or if other sausage casings are used, for example those consisting of cellulose or synthetic material, adhesive bonding takes place in another way with the addition of a suitable adhesive.

After the netting has been torn open, it is generally to be removed from the sausage casing. If it is bonded very firmly to the sausage casing over the entire surface, the edges of the netting which are adjacent to the tear after tearing-open remain connected to the sausage casing and are difficult to grasp in order to remove the netting. Expediently, therefore, the regions of the netting which are adjacent to the tear open thread remain at least partially non-bonded to the sausage casing. It is simplest if a region adjacent to the tear-open thread, for example the two edge strips adjacent to the tear-open thread, remain non-bonded or are bonded to a lesser extent than outside this region. It is generally sufficient if only one edge strip remains completely or partially non-bonded. The width of this edge strip is dimensioned, on the one hand, such that it can easily be grasped, but, on the other hand, so narrow that the overall handling of the sausage casing together with the netting is not impaired. In general, it is sufficient if an edge having the width of one or two meshes remains bond-free on both sides or on one side of the tear-open thread. The netting or the sausage casing may be coated or impregnated, in that region in which bonding is to be prevented, with a material which has a bond-inhibiting action, for example with a wax.

Instead or in addition, the measure described below may be adopted, which makes it easier to grasp and release the netting from the sausage after tearing-open. Within a region adjacent to the tear-open thread, a material for the netting is used which is more elongatable than the material used outside this region. For example, a yarn is used, of which the elongation at tear is higher than 20%, preferably higher than 30%, or which is at least twice, preferably three times, as high as the elongation at tear of the yarn used outside the region. Alternatively, within the region adjacent to the tear-open thread, a yarn is used which is correspondingly more elongatable than the sausage casing. The effect of these measures is that, during tearing-open, the yarn in this region is elongated under the force in this case exerted and is at the same time released from the sausage casing.

When the sausage casing is being filled, the connection between the encasing netting and the sausage casing may be exposed to high frictional forces which act mainly in the longitudinal direction. This affects, in particular, the connection between the transversely running strands of the encasing netting and the sausage casing. It may therefore be expedient to ensure that, in addition to such transversely running netting strands, there are also those which run in a longitudinal direction, and that mainly these are used for adhesively bonding the encasing netting to the sausage casing. Adhesive bonding may even be restricted to these netting strands running in the longitudinal direction or, with regard to these, be at least more secure or more frequent or over a larger area than in the region of the transversely running netting strands.

In the finished product, on which the encasing netting is closed at the ends, generally together with the sausage casing, according to the invention the tear-open thread is likewise to be secured in the end closures, so that, during tearing open, it cannot be pulled out under the force acting on it.

The invention relates primarily to sausage and similar foodstuffs which are packaged in an encasing tube having end closures. However, it is not restricted to these.

BRIEF DESCRIPTION OF THE DRAWINGS

The invention is explained in more detail below with reference to the drawing which illustrates an advantageous exemplary embodiment and in which.

DETAILED DESCRIPTION OF THE PREFERRED EMBODIMENTS

Figure 1:
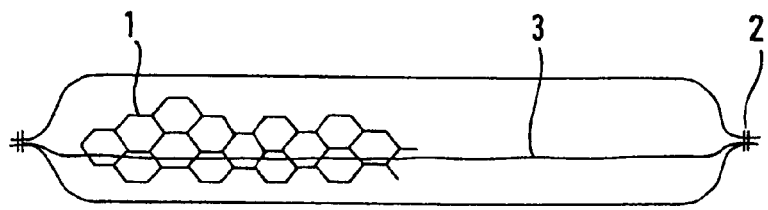
FIG. 1 shows an overall view of a sausage provided with an encasing netting and with a tear-open thread.

The sausage according to FIG. 1 is contained in a sausage casing which is sealingly surrounded on the outside by an encasing netting 1. The sausage casing and the netting 1 are closed together at the ends, for example by means of clips 2. A tear-open thread 3, which is provided to run continuously lengthways in the encasing netting 1, is also bound into the clips in a tension-resistant manner.

Figure 3:
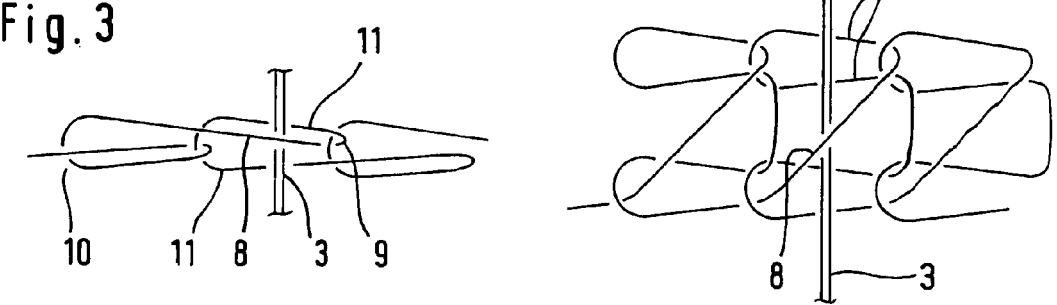
FIGS. 3 and 4 show various stitch patterns of a netting strand with tear-open thread.
Figure 4:
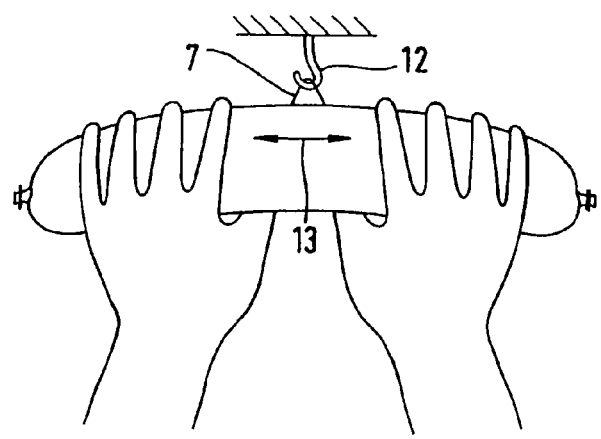

The encasing netting 1 comprises honeycombs 4 which are formed by longitudinal strands 5 and transverse strands 6. It is preferably a double-rib or warp-knit fabric which is produced as a tube and in which the transversely running strands 6 are knitted as chain stitches and the longitudinally running strands 5 are knitted as a tricot. The longitudinally running strands 5 expediently comprise a plurality of (for example, 5) stitches, so that they have some longitudinal extension and thereby make sufficient area available for an adhesive connection to the sausage casing lying beneath. The transversely running strands 6 may have a single-stitch design (FIG. 3) or else a multistitch design (FIG. 4, three-stitch). In any event, the tear-open thread 3 expediently lies between the sinker thread 8, which runs through from the foot 9 of one stitch to the head 10 of the next stitch, on the one hand, and the legs 11 of a stitch, on the other hand. In this case, the sinker thread 8 is to lie on the outside of the fabric, so that it alone needs to be torn by the tear-open thread 3. The associated stitch as a whole subsequently comes loose.

If the tear-open thread 3 is led through all the transverse strands lying in a row one behind the other, the encasing netting is thereby torn open as a whole and can easily be removed from the sausage. The latter can thereafter easily be skinned in the usual way. The tearing-open operation is made easier when the tear-open thread is adhesively bonded or otherwise connected to the stitches receiving it, in such a way that no stitch can slide along the tear-open thread and be gathered together with the next stitch. The same aim is achieved by means of the slide-resistant connection of the stitch or of the strand containing it to the sausage casing.

Although the tear-open thread 3 is expediently led through stitches of the transversely running strands, it may, instead, also be led through a longitudinally running honeycomb strand 5. This applies particularly when the latter contains only one or few stitches.

Figure 2:
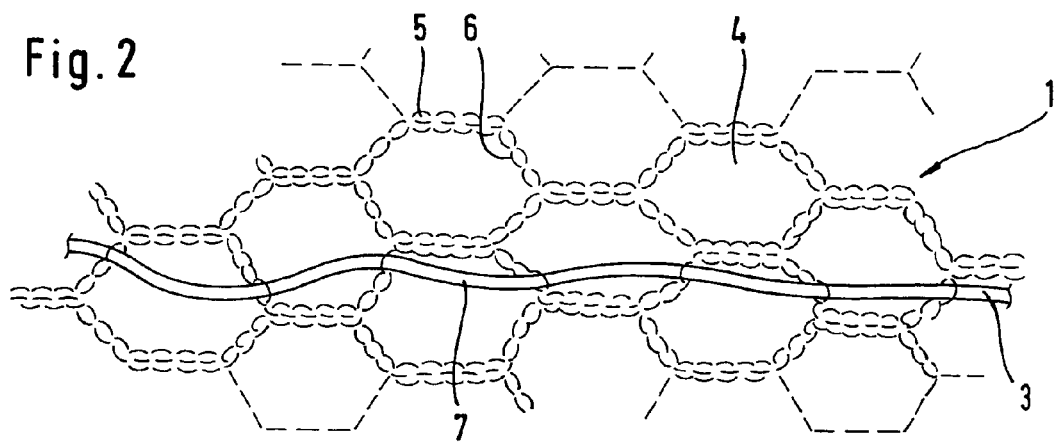
FIG. 2 shows an enlarged part view of the encasing netting with tear-open thread.

The encasing netting is produced in the longitudinally stretched state. The transverse strands 6 receiving the tear-open thread and running with a considerable transverse component in the state of use (FIG. 2) are then oriented more or less in the longitudinal direction. The stitches, receiving the tear-open thread 3, of successive transverse strands are then further away from one another than in the state of use. When the netting is subsequently converted into the state of use, the netting is shortened, whereas the tear-open thread 3 preserves its length and forms, between the transverse strands 6 receiving it, loops which are accessible from outside and can be grasped for tearing open.

Figure 5:
FIG. 5 shows the tearing-open operation.

Since the threads of the encasing netting are relatively thick, if only for visual reasons, the tearing open of the netting may necessitate considerable effort in spite of the fact that this is made easier by virtue of the invention. There is less of this effort if the procedure according to FIG. 5 is adopted. A loop 7 of the tear-open thread in the middle region of the sausage is suspended in a fixed hook 12 and thereafter the sausage grasped with both hands is moved vigorously in the direction of the arrow 13 first to one side and then to the other.

The invention claimed is:

1. A tubular encasing netting for sausage, which has a structure which is extendible in the longitudinal direction, wherein said encasing netting has a longitudinally running tear-open thread, the length of which is greater than that of the encasing netting when in the state of use and forms at least one loop capable of being grasped on the outside of the encasing netting, the ends of the loop being connected to points of the encasing netting which are at a greater distance from one another in the longitudinally extended state of the encasing netting than in its state of use.

2. The netting as claimed in claim 1, wherein the encasing netting comprises honeycomb strands which are composed of knitting stitches, and the tear-open thread is bound into these.

3. The netting as claimed in claim 2, wherein the honeycomb strands of the encasing netting are knitted partially as chain stitches, and the tear-open thread is bound into the chain stitches.

4. The netting as claimed in claim 3, wherein the tear-open thread lies between a pair of stitch legs and a sinker thread.

5. The netting as claimed in claim 4, wherein the sinker thread lies on the outside of the encasing netting.

6. The netting as claimed in claim 2, wherein the sausage includes an associated sausage casing and the encasing netting strands containing the tear-open thread are adhesively bonded to the associated sausage casing and/or to the tear-open thread.

7. The encasing netting as claimed in claim 6, wherein the encasing netting is not adhesively bonded to the sausage casing in the vicinity of the tear-open thread.

8. The encasing netting as claimed in claim 6, which comprises a more elongatable material in a region adjacent to the tear-open thread than outside this region.

9. A sausage casing which is connected to an encasing netting as claimed in claim 1.

10. The sausage casing as claimed in claim 9, wherein the encasing netting is adhesively bonded to the sausage casing.

11. The sausage casing as claimed in claim 10, wherein, in a region adjacent to the tear-open thread, the encasing netting is not adhesively bonded or is adhesively bonded to a lesser extent to the sausage casing than outside this region.

12. The sausage casing as claimed in claim 10, wherein the encasing netting consists of a more elongatable material in a region adjacent to the tear-open thread than outside this region.

13. The sausage casing as claimed in claim 10, wherein the knitted encasing netting comprises honeycombs having longitudinal and transverse strands, said longitudinal strands being knitted as a tricot, and adhesive bonding to the sausage casing is more secure or more frequent or over a larger area in the region of said longitudinal strands than in the region of the transverse strands.

14. A sausage with a sausage casing closed at the ends, wherein said sausage is encased by an encasing netting as claimed in claim 1 and the ends of the tear-open thread are secured in the end closures of the sausage casing.

15. A sausage with a sausage casing closed at the ends, wherein said sausage is encased by a sausage casing as claimed in claim 10 and the ends of the tear-open thread are secured in the end closures of the sausage casing.

* * * * *